W. R. IHRIG.
SPRING WHEEL.
APPLICATION FILED JULY 17, 1911.
1,031,269.
Patented July 2, 1912.
2 SHEETS—SHEET 1.
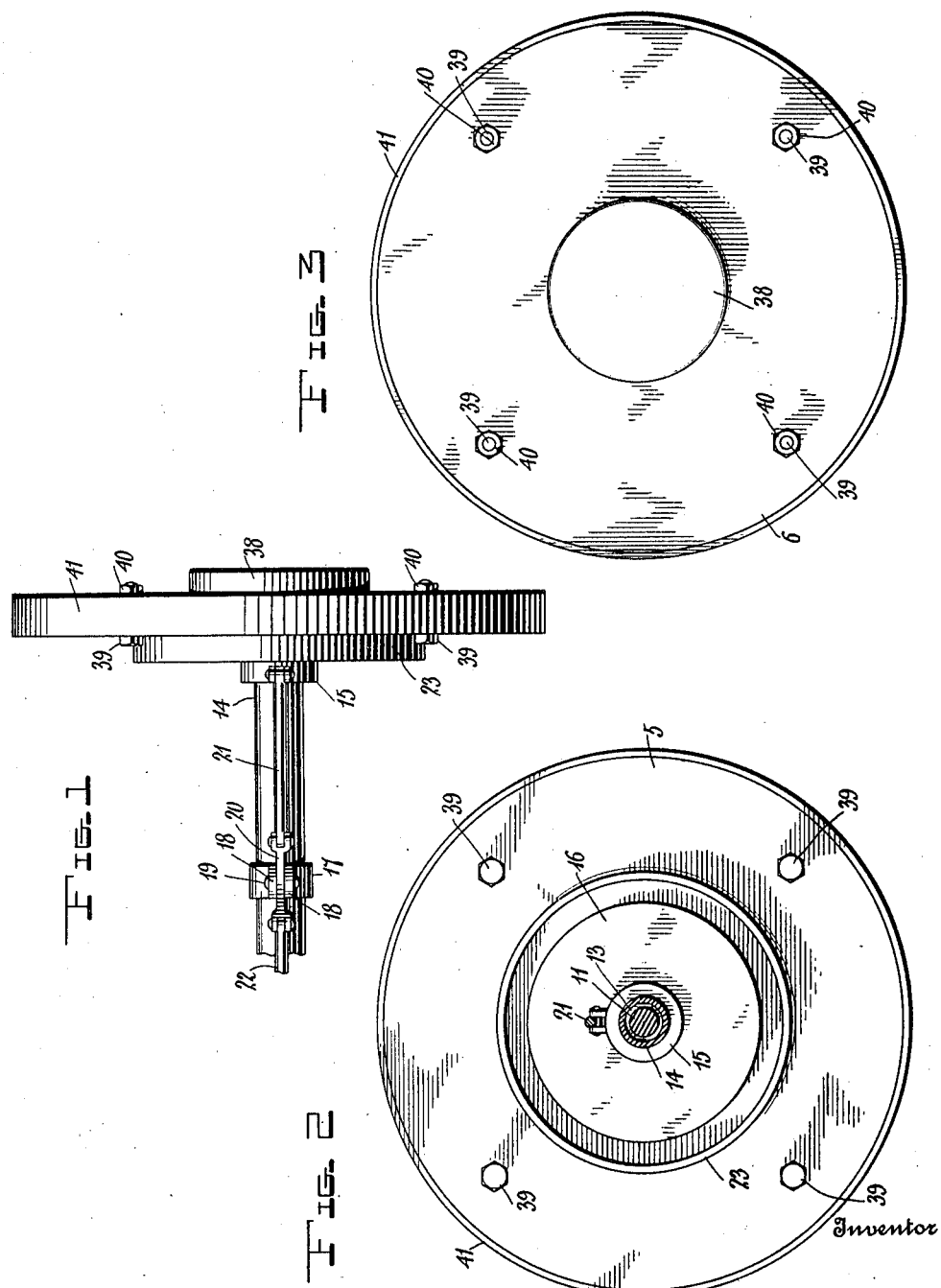

W. R. IHRIG.
SPRING WHEEL.
APPLICATION FILED JULY 17, 1911.
1,031,269.
Patented July 2, 1912.
2 SHEETS—SHEET 2.
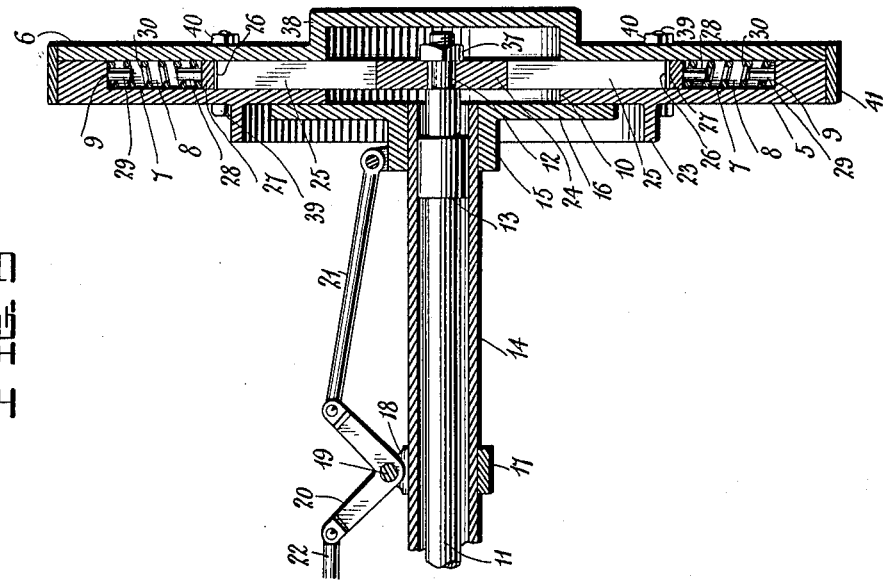
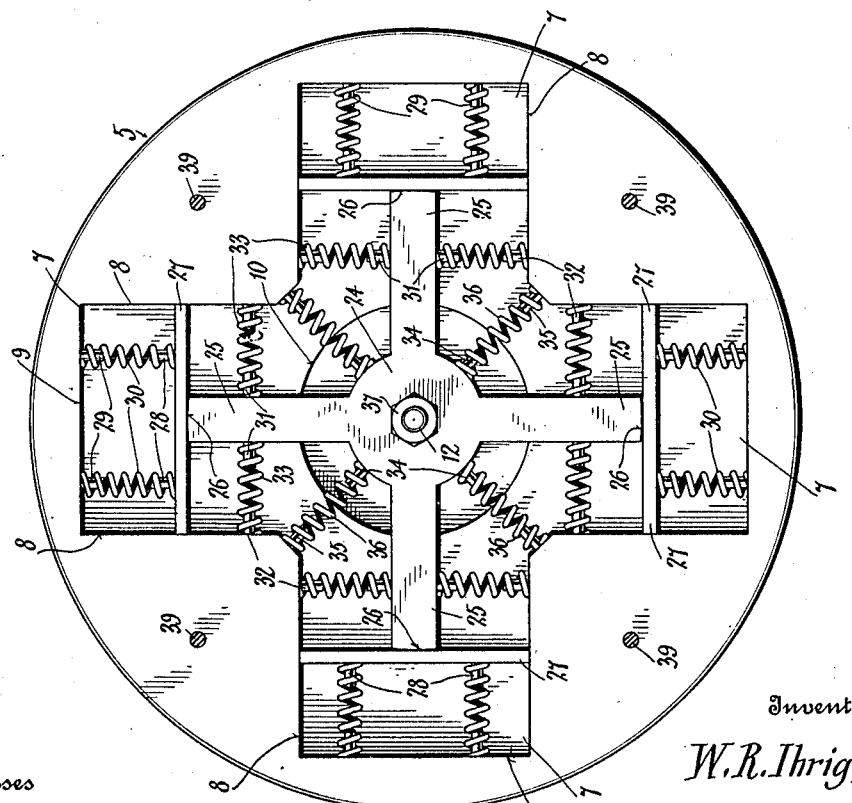
Witnesses
Inventor
W. R. Ihrig,
By
Attorneys

UNITED STATES PATENT OFFICE.

WILLIAM R. IHRIG, OF WITHERS MILLS, MISSOURI.

SPRING-WHEEL.

1,031,269.  Specification of Letters Patent.  Patented July 2, 1912.

Application filed July 17, 1911. Serial No. 639,026.

*To all whom it may concern:*

Be it known that I, WILLIAM R. IHRIG, a citizen of the United States, residing at Withers Mills, in the county of Marion, State of Missouri, have invented certain new and useful Improvements in Spring-Wheels; and I do hereby declare the following to be a full, clear, and exact description of the invention, such as will enable others skilled in the art to which it appertains to make and use the same.

This invention relates to an improvement in vehicle wheels which are especially adapted for use in connection with motor vehicles, and it has for its principal object to obviate the necessity of using pneumatic tires by providing a wheel wherein a plurality of coil springs are interposed and mounted in a novel manner to afford ample resiliency to absorb all shock and vibration incident to the passage of a wheel over rough places.

Another object of the invention is to provide a wheel for the purpose described which is simple in construction, being composed of a minimum number of parts, is easy to assemble and disassemble when the occasion may require, and is also cheap to manufacture.

With these and other objects in view, the invention consists in the construction and novel combination of parts hereinafter fully described, illustrated in the accompanying drawings, and pointed out in the claims hereto appended; it being understood that various changes in the form, proportion, size and minor details of construction, within the scope of the claims, may be resorted to without departing from the spirit or sacrificing any of the advantages of the invention.

In the drawings; Figure 1 is a detail top plan view showing a wheel, constructed in accordance with my invention, mounted upon the rear axle of a motor vehicle, Fig. 2 is an elevation showing the inner face of the wheel, Fig. 3 is an elevation showing the outer face of the wheel, Fig. 4 is an elevation of the wheel, the outer section being removed, and Fig. 5 is a sectional view through the construction shown in Fig. 1.

Like reference numerals designate corresponding parts in all the figures of the drawings.

Referring to the drawings, the invention comprises a wheel which includes a casing that is formed by an inner section 5 and an outer section 6, said sections being formed of metal and shaped to form disks. A plurality of radially extending recesses 7 are formed in the inner face of the inner section 5. Each of these recesses includes spaced side walls 8—8 and an end wall 9, the end wall being disposed in close proximity to but spaced from the periphery of the section, and the side walls 8 intersecting the side walls of the adjacent recesses. Concentrically formed in said inner section 5 is a large circular opening 10. An axle 11 has one end projecting through the opening 10 from the inner side of the section, and has its projected end reduced as shown by the reference numeral 12. Integral with the axle and spaced from said reduced end is an enlarged bearing 13 around which is mounted a sleeve 14. Slidably mounted on the sleeve 14 is a hub 15 of a brake disk 16, the latter being adapted to bear against the inner face of the inner section 5. Secured around the sleeve in spaced relation to the hub 15 is a clip 17, said clip terminating in spaced ears 18—18. A pivot pin 19 is connected to the ears, and mounted upon the pin for movement is a bell-crank lever 20. A link 21 is pivotally connected at one end to one arm of the lever 20, and at its other end to the hub 15 by any suitable means. An operating rod 22 of any suitable construction is connected to the free end of the other arm of the lever for actuating said lever and consequently the brake disk 16.

Integral with the inner section 5 and projecting laterally around the disk 16 is a dust flange 23 by means of which dust is prevented from working in between the inner section 5 and the disk 16.

Fixedly mounted upon the reduced end 12 of the axle, by means of a key or the like, is a hub 24, and radially projecting from the hub is a plurality of spokes 25 which are respectively disposed within the recesses 7 of the inner section 5. These spokes each terminate in spaced relation to the end wall 9 of the recesses 7, and have their ends 26 curved concentrically to the center of the hub 24. The hub 24 and the spokes 25 are formed of metal and have a uniform thickness equal to the depth of the recesses 7, so that their outer faces lie substantially in the same plane as the outer face of the inner section 5.

Transversely disposed within each of the recesses 7 and bearing against the ends 26 of the spokes 25 are bars 27. Projecting outwardly from the bars and at equal distances from the centers thereof are spaced studs 28—28, said studs projecting in the direction of the end wall 9 of the recesses. Projecting inwardly from the end wall 9 of the recesses are spaced studs 29—29, which are respectively disposed in alinement with the studs 28. Interposed between each pair of studs is a coil spring 30, which normally urges the bar 27 against the end 26 of the spoke 25.

Oppositely projecting from each spoke 25 are studs 31—31, and projecting inwardly from the side walls 8 of the recesses 7 opposite the studs 31 are other studs 32—32. Disposed between the studs 31 and 32 are coil springs 33—33, which tend to normally hold the spokes centrally within the recesses. In order to further assist in normally holding the hub 24 in its central position there is provided a plurality of radially extending studs 34—34, said studs extending from the periphery of the hub and being disposed intermediate the spokes 25. Projecting inwardly from the juncture of the walls 8 of the recesses are other studs 35, and between the studs 34 and 35 are coil springs 36. A nut 37 is secured to the outer end of the axle 11 and serves to hold the hub 24 in its proper position. It will be observed in this connection that when the axle 11 revolves the hub 24 and the spokes 25 will revolve therewith.

The outer section 6 is centrally provided with a projecting cap 38, said cap being disposed over and around the hub 24 and the nut 37. This section is disposed in ground engagement with the inner section 5, and these sections are secured together by bolts 39 and nuts 40, or other suitable fastening means. A tire 41 of any suitable construction is mounted on the periphery of the inner and outer sections in any suitable manner.

From the foregoing, it will be observed that when the wheel strikes any obstruction the inner and outer sections will rise against the tension of the coil springs. It will also be observed that when the motor is first started, the springs 33 will prevent any unnecessary jarring to the body of the vehicle, said springs affording a resilient means for taking up such jars. It will furthermore be observed that by reason of the fact that the ends 26 of the spokes 25 are rounded when said spokes are caused to move they will be permitted to do so with the least possible resistance.

What is claimed is:—

1. In combination with an axle, of a hub carried by the end thereof, spokes radiating from the hub, a casing for the hub and spokes consisting of opposed inner and outer circular sections disposed in ground engagement, the inner section being concentrically formed with an opening for receiving the axle, one of the sections being formed on its inner face with a plurality of recesses for receiving the hub and the spokes, said recesses including spaced side walls and an end wall, transverse bars respectively disposed within the recesses between the outer ends of the spokes and the end walls of the recesses, a plurality of springs disposed within the recesses between the bars and the end walls of said recesses, and other springs disposed within the recesses between the sides of the spokes and the side walls of the recesses.

2. In combination with an axle, of a hub carried by the end thereof, spokes radiating from the hub, a casing for the hub and spokes consisting of opposed inner and outer circular sections disposed in ground engagement, the inner section being concentrically formed with an opening for receiving the axle, one of the sections being formed on its inner face with a plurality of recesses for receiving the hub and the spokes, said recesses including spaced side walls and an end wall, transverse bars respectively disposed within the recesses between the outer ends of the spokes and the end walls of the recesses, a plurality of springs disposed within the recesses between the bars and the end walls of said recesses, other springs disposed within the recesses between the sides of the spokes and the side walls of the recesses, and other springs disposed within the recesses and respectively having one end abutting the hub intermediate a pair of spokes and the other end bearing against the juncture between the side walls of an adjacent pair of recesses.

In testimony whereof, I affix my signature, in presence of two witnesses.

WILLIAM R. IHRIG.

Witnesses:
  ALLEN E. DENT,
  WILL IHRIG.

---

Copies of this patent may be obtained for five cents each, by addressing the "Commissioner of Patents, Washington, D. C."